(12) United States Patent
Ortiz Batalle

(10) Patent No.: US 12,076,792 B2
(45) Date of Patent: Sep. 3, 2024

(54) CHUCK HAVING A LOCKING DEVICE

(71) Applicant: LLAMBRICH PRECISION, S.L., L'Hospitalet de Llobregat (ES)

(72) Inventor: Antoni Ortiz Batalle, Montornes del Valles (ES)

(*) Notice: Subject to any disclaimer, the term of this patent is extended or adjusted under 35 U.S.C. 154(b) by 581 days.

(21) Appl. No.: 17/426,322

(22) PCT Filed: Feb. 3, 2020

(86) PCT No.: PCT/EP2020/052588
§ 371 (c)(1),
(2) Date: Jul. 28, 2021

(87) PCT Pub. No.: WO2020/169329
PCT Pub. Date: Aug. 27, 2020

(65) Prior Publication Data
US 2022/0105576 A1 Apr. 7, 2022

(30) Foreign Application Priority Data
Feb. 20, 2019 (EP) ...................................... 19382122

(51) Int. Cl.
*B23B 31/12* (2006.01)

(52) U.S. Cl.
CPC ........ *B23B 31/123* (2013.01); *B23B 31/1253* (2013.01); *B23B 2231/38* (2013.01); *Y10T 279/17615* (2015.01)

(58) Field of Classification Search
CPC .............. B23B 31/123; B23B 31/1253; B23B 2231/38; Y10T 279/17615
See application file for complete search history.

(56) References Cited

U.S. PATENT DOCUMENTS

| | | | | |
|---|---|---|---|---|
| 1,225,089 | A * | 5/1917 | Weir | B23B 31/1253 279/64 |
| 7,503,565 | B2 * | 3/2009 | Rohm | B23B 31/123 279/140 |
| 7,726,663 | B2 * | 6/2010 | Mack | B23B 31/123 279/140 |
| 2013/0270779 | A1 * | 10/2013 | Campbell | B23B 31/123 279/60 |

* cited by examiner

*Primary Examiner* — Eric A. Gates
*Assistant Examiner* — Reinaldo A Vargas Del Rio
(74) *Attorney, Agent, or Firm* — Eugenio J. Torres-Oyola; Victor M. Rodriguez-Reyes; Rafael Rodriguez-Muriel

(57) ABSTRACT

The chuck comprises a base body (1) having a central axis (12), an outer casing (2) axially fixed but rotatable about the central axis (12) outside the base body (1), the outer casing (2) having inner guides (15) and a plurality of jaws (3) movable along the inner guides (15), a fitting mechanism linking rotations of the outer casing (2) to movements of the jaws (3), and a locking device comprising a ratchet mechanism operated by an outer control sleeve (14). The ratchet mechanism comprises a toothed ring (5) fixed to the base body (1), a pawl fixed to a lever (10) pivotally mounted to the outer casing (2) about a pivot pin (9) parallel to the central axis (12), and an elastic element (28) urging the pawl (6) to engage 10 the toothed ring (5). The control sleeve (14) is rotatable and axially movable in cooperation with a cam (8).

10 Claims, 4 Drawing Sheets

CHUCK HAVING A LOCKING DEVICE

TECHNICAL FIELD

The present invention relates to a chuck provided with a locking device that can be manually operated by a user for locking the jaws of the chuck in a gripping position, preventing the jaws from loosening regardless of the rotation direction of the chuck.

BACKGROUND OF THE INVENTION

Keyless chucks are known which comprise a base body having a central axis and being connectable for rotating with a drive shaft, an outer casing axially fixed but rotatable about the central axis outside the base body, the outer casing having inner guides leading to an axial opening, a plurality of jaws movable along the inner guides and a fitting mechanism linking rotations of the outer casing to movements of the jaws, such that rotation of the outer casing with respect to the base body in a tightening direction moves the jaws towards the central axis and rotation of the outer casing with respect to the base body in an opposite loosening direction moves the jaws away from the central axis.

Optionally, this type of chucks include a locking device comprising a ratchet mechanism configured to block rotation of the outer casing with respect to the base body in the loosening direction but allow relative rotation in the tightening direction when the ratchet mechanism is activated and to allow relative rotation between the outer casing and the base body in both loosening and tightening directions when the ratchet mechanism is deactivated.

Document US 2006208435 A1 discloses a chuck of the type described above which includes an outer control sleeve operating the ratchet mechanism. The ratchet mechanism comprises a toothed ring fixed to the base body, a pawl pivotally mounted to the outer casing about a pivot pin parallel to the central axis, and an elastic element urging the pawl to engage the toothed ring. The toothed ring comprises a plurality of teeth protruding in a direction perpendicular to the central axis. The control sleeve is axially fixed but rotatable about the central axis outside the outer casing between angular locking and releasing positions and has inner surfaces which interact with a lever fixed to the pawl forcing the pawl to disengage from the toothed ring when the control sleeve in the angular release position or provide room for letting the elastic element to move the pawl into engagement with the toothed ring when the control sleeve in the angular locking position.

Document WO 2017051232 A1 discloses a chuck including a locking device with a ratchet mechanism comprising a toothed ring fixed to an outer casing, a ratchet ring made of sheet metal arranged such that it can axially slide but not rotate with respect to a base body and provided with elastic pawls, an elastic element arranged under compression between the ratchet ring and the toothed ring. The toothed ring comprises a plurality of teeth protruding in a direction parallel to the central axis. The locking device further comprises a control sleeve rotatably and slidably connected to the base body in cooperation with a cam. The cam is configured to move the control sleeve to an axial locking position when the control sleeve is rotated with respect to the base body in a locking direction and to move the control sleeve to an axial releasing position when the control sleeve is rotated with respect to the base body in an opposite releasing direction. A surface of the control sleeve axially urges the elastic pawls to engage with the toothed ring when the control sleeve is in the axial locking position, and the control sleeve lets the elastic element to move the elastic pawls to disengage from the toothed ring when the control sleeve is in the axial releasing position.

DISCLOSURE OF THE INVENTION

The present invention provides a chuck having a locking device, comprising a base body having a central axis and being connectable for rotating with a drive shaft, an outer casing axially fixed but rotatable about the central axis outside the base body, the outer casing having inner guides leading to an axial opening, a plurality of jaws movable along the inner guides, a fitting mechanism linking rotations of the outer casing to movements of the jaws, such that rotation of the outer casing with respect to the base body in a tightening direction moves the jaws towards the central axis and rotation of the outer casing with respect to the base body in an opposite loosening direction moves the jaws away from the central axis, and a locking device comprising a ratchet mechanism and an outer control sleeve operating the ratchet mechanism.

The ratchet mechanism comprises a toothed ring fixed to the base body, a pawl pivotally mounted to the outer casing about a pivot pin parallel to the central axis, and an elastic element urging the pawl to engage the toothed ring. The control sleeve is movable about the central axis between a releasing position and a locking position. In the locking position, an inner surface of the control sleeve engages a lever fixed to the pawl and thereby moves the pawl to disengage from the toothed ring against a force exerted by the elastic element. In the releasing position, the control sleeve does not engage the lever and allows the elastic element to move the pawl into engagement with the toothed ring.

The ratchet mechanism is configured to block rotation of the outer casing with respect to the base body in the loosening direction but allow relative rotation in the tightening direction when the control sleeve in the locking position and to allow relative rotation between the outer casing and the base body in both loosening and tightening directions when the control sleeve is in the releasing position.

The control sleeve has a proximal portion rotatably and slidably connected to the base body in cooperation with a cam. The cam is configured to move the control sleeve to an axial locking position when the control sleeve is rotated with respect to the base body in a locking direction and to move the control sleeve to an axial releasing position when the control sleeve is rotated with respect to the base body in an opposite releasing direction.

The control sleeve further has a cantilevered distal portion which covers the ratchet mechanism. The cantilevered distal portion has an inner annular protrusion and an inner annular recess. Preferably, the inner annular recess of the cantilevered distal portion of the control sleeve is located adjacent to the inner annular protrusion.

The inner annular protrusion has an inner diameter that interferes with the lever when the pawl is engaged with the toothed ring, so that the inner annular protrusion engages the lever fixed to the pawl and thereby moves the pawl to disengage from the toothed ring against the force exerted by the elastic element when the control sleeve is in the axial releasing position. The inner annular recess has an inner diameter that does not interfere with the lever when the pawl is engaged with the toothed ring, so that the inner annular recess provides room enough for allowing the lever to be moved by the force exerted by the elastic element to engage the pawl with the toothed ring when the control sleeve is in the locking position.

In one embodiment, the lever has a beveled edge intended to interact with the inner annular protrusion in order to facilitate mutual engagement when the control sleeve is moved from the locking position to the releasing position. In another alternative embodiment, the inner annular protrusion has a beveled edge intended to interact with the lever to facilitate mutual engagement when the control sleeve is moved from the locking position to the releasing position. In still another alternative embodiment, the lever and the inner annular protrusion have respective beveled edges intended to interact with each other to facilitate mutual engagement when the control sleeve is moved from the locking position to the releasing position.

Preferably, the toothed ring comprises a plurality of teeth protruding in a direction perpendicular to the central axis. For example, the teeth of the toothed ring are arranged in an axial direction and have crests and valleys parallel to the central axis. However, other configurations for the teeth of the toothed ring are also envisaged. In any case, the pawl will be configured according to the configuration of the toothed ring.

In one embodiment, the elastic element is a coil spring arranged under compression between a seat formed in the outer casing and the lever fixed to the pawl.

In a preferred embodiment, the cam is as the one described in the cited document WO 2017051232 A1 and comprises a cam groove formed in a locking ring arranged outside the base body and fixed inside to the proximal portion of the control sleeve and a pin installed in a hole formed in the base body and inserted in the cam groove.

The locking device of the chuck of the present invention converts, by virtue of the particular features thereof, an axial movement of the control sleeve with respect to the base body into a pivoting movement of the pawl about a pivot pin perpendicular to the central axis. With this construction, the chuck of the present invention has a locking device that is more reliable and makes use of less components than other comparable chucks of the prior art.

BRIEF DESCRIPTION OF THE DRAWINGS

The invention will be more fully understood from the following description of an illustrative and non limitative exemplary embodiment with reference to the accompanying drawings, in which.

DETAILED DESCRIPTION OF AN EXEMPLARY EMBODIMENT

Figure 1:
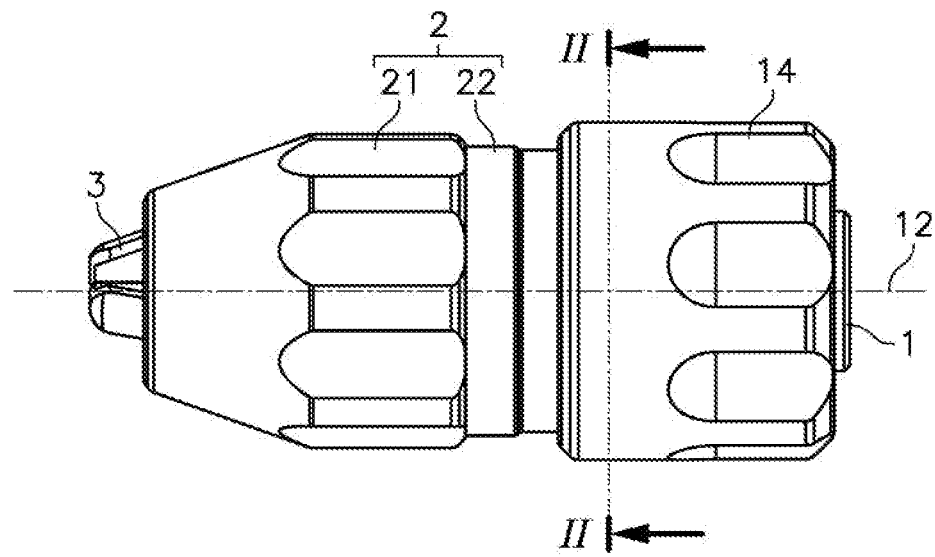
FIG. 1 is a side view of a chuck having a locking device according to an embodiment of the present invention showing a control ring in an axial releasing position.

Referring to the Figures, the chuck having a locking device according to an embodiment of the present invention comprises a base body 1 having a central longitudinal axis 12. The base body is configured to be connected to a drive shaft (not shown) for rotating therewith. The drive shaft can belong, for example, to a machine, a power tool or a hand-powered tool, and can be able to rotate in either direction.

An outer casing 2 is coupled outside the base body 1 such that the outer casing 2 can rotate coaxially but not move axially with respect to the base body 1. The outer casing 2 comprises a front fitting sleeve 21 and a rear sleeve 22 fixedly connected to one another by a threaded coupling 16. The Outer casing 2 further comprises a guide body 20 housed in the front fitting sleeve 21 and fixedly connected to the rear sleeve 22 by a threaded coupling 17. The guide body 20 has inner guides 15 inclined in converging directions towards an axial opening. A plurality of jaws 3 are movable along the inner guides 15. The outer casing 2 rotates with respect to the base body 1 in cooperation with rolling elements 25 arranged between the rear sleeve 22 and the base body 1. The rolling elements 25 are configured to withstand mainly axial loads.

The chuck includes a fitting mechanism linking movements of the outer casing 2 to movements of the jaws 3 to fit the jaws 3 to bits having different diameters. In this exemplary embodiment, the fitting mechanism is a keyless self-tightening mechanism comprising a pusher 4 coupled to the base body 1 by a threaded coupling (not shown). The pusher is further coupled such that it can slide axially but not rotate coaxially with respect to the outer casing 2. Relative rotation between the outer casing 2 and the base body 1 translates into axial displacement of the pusher 4. The jaws 3 are linked to the pusher 4 such that the jaws are moved fro and aft along the guides 15 by the pusher.

Rotation of the outer casing 2 together with the pusher 4 with respect to the base body 1 in a tightening direction moves the jaws 3 towards the central longitudinal axis 12 and out of the front fitting sleeve 21. Rotation of the outer casing 2 together with the pusher 4 with respect to the base body 1 in an opposite loosening direction moves the jaws 3 away from the central longitudinal axis 12 and into the front fitting sleeve 21.

Preferably, the base body 1 has an axial through hole 18 and the pusher 4 has a corresponding axial through hole aligned and communicated with the axial through hole 18 of the base body 1. This allows the jaws 3 to grip rods inserted along the entire length of the chuck.

Note that the particular features of the fitting mechanism described above are not part of the present invention and that the chuck with locking device of the present invention can include a fitting mechanism having a different configuration.

To prevent the grip of the jaws 3 from loosening when the drive shaft rotates the chuck in the loosening direction, the chuck includes a locking device comprising a ratchet mechanism and an outer control sleeve 14 operating the ratchet mechanism.

The ratchet mechanism comprises a toothed ring 5 fixed to the base body 1, a pawl 6 fixed to a lever 10 pivotally mounted to the outer casing 2 about a pivot pin 9 parallel to the central axis 12, and an elastic element 28 urging the pawl 6 to engage the toothed ring 5. The pivot pin 9 is preferably located between the lever 10 and the pawl 6. In the shown embodiment, the elastic element 28 is a coil spring arranged under compression between a seat 31 formed in the outer casing 2 and the lever 10 fixed to the pawl 6.

In the shown embodiment, the toothed ring 5 comprises a plurality of teeth protruding in a direction perpendicular to the central axis 12. More in particular, in the shown embodiment the toothed ring 5 comprises a plurality of teeth having crests and valleys parallel to the central axis 12.

Figure 2:
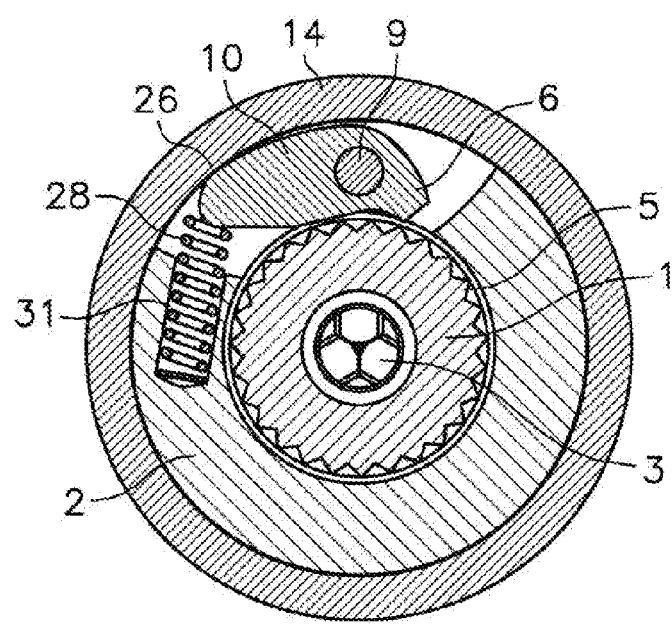
FIG. 2 is a cross-sectional view taken by the plane II-II of FIG. 1 showing the control ring in the axial releasing position and a ratchet mechanism in a deactivated condition.
Figure 3:
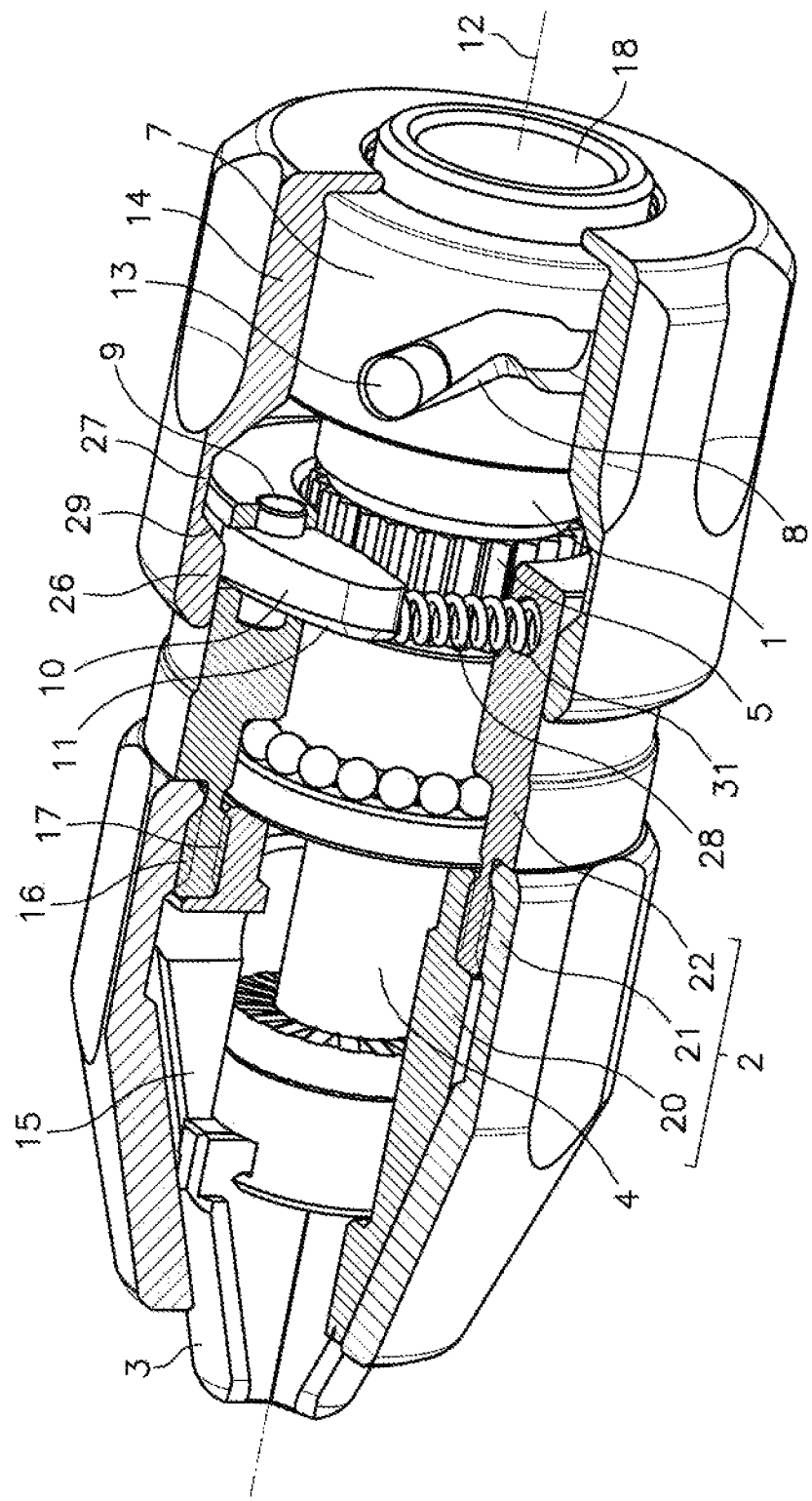
FIG. 3 is a partially sectioned perspective view of the chuck showing the control ring in the axial releasing position and the ratchet mechanism in the deactivated condition.
Figure 4:
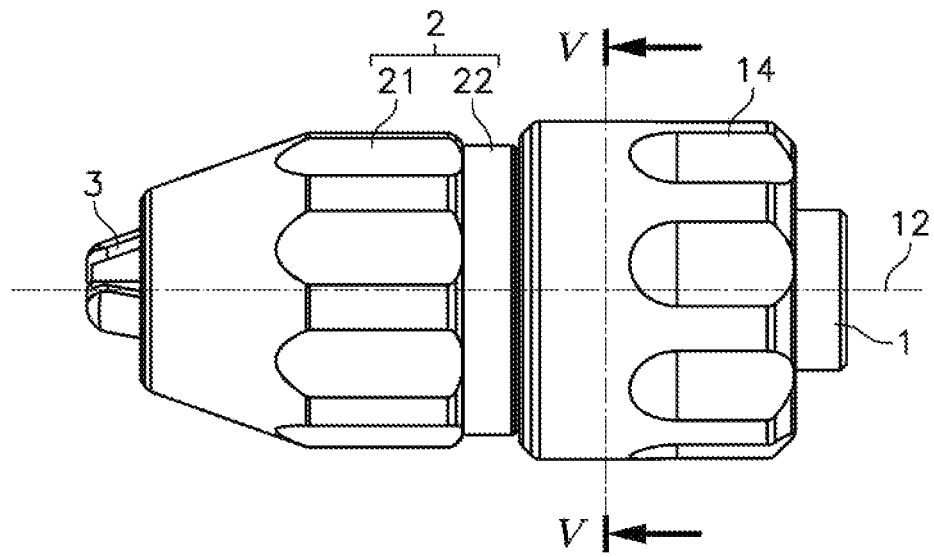
FIG. 4 is a side view of the chuck showing the control ring in an axial locking position.
Figure 5:
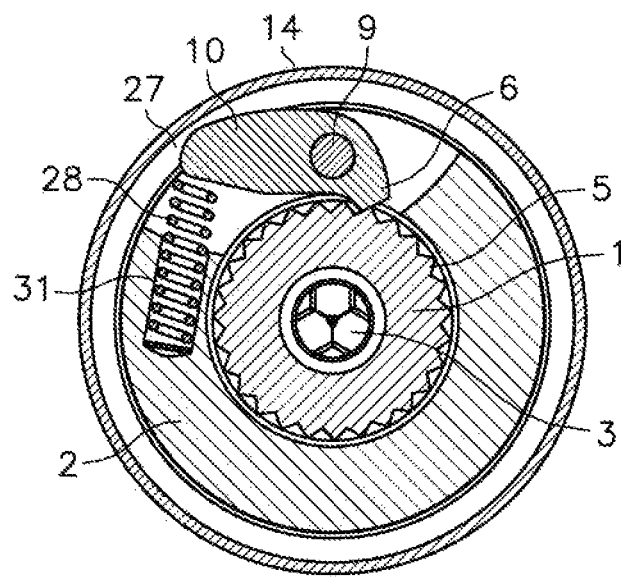
FIG. 5 is a cross-sectional view taken by the plane V-V of FIG. 4 showing the control ring in the axial locking position and the ratchet mechanism in an activated condition.
Figure 6:
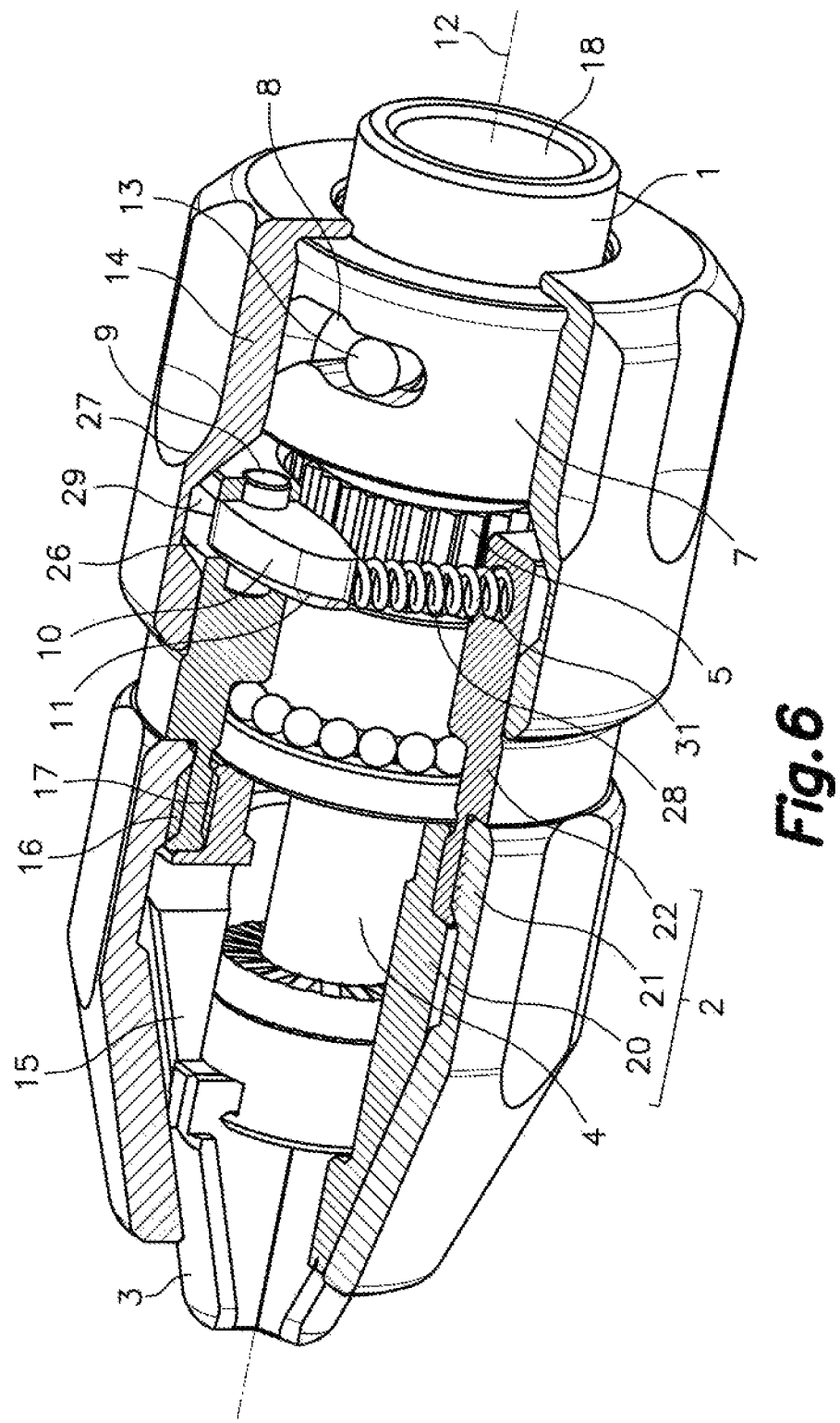
FIG. 6 is a partially sectioned perspective view of the chuck showing the control ring in the axial locking position and the ratchet mechanism in the activated condition.

The control sleeve 14 has a proximal portion rotatably and slidably connected to the base body 1 in cooperation with a cam 8 and a cantilevered distal portion which covers the ratchet mechanism. The cam 8 comprises a cam groove and a pin 13. The cam groove is formed in a locking ring 7 arranged so that it can slide and rotate outside the base body 1 and fixed inside to the proximal portion of the control sleeve 14. The pin is 13 installed in a hole formed in the base body 1 and inserted in the cam groove. The cam groove of the cam 8 is configured to move the control sleeve 14 to an axial locking position (FIGS. 1-3) when the control sleeve 14 is rotated with respect to the base body 1 in a locking direction and to move the control sleeve 14 to an axial releasing position (FIGS. 4-6) when the control sleeve 14 is rotated with respect to the base body 1 in an opposite releasing direction.

The cantilevered distal portion of the control sleeve 14 has an inner annular protrusion 26 and an inner annular recess 27. The inner annular recess 27 is preferably located adjacent the inner annular protrusion 26. The inner annular protrusion 26 has an inner diameter that interferes with the lever 10 when the pawl 6 is engaged with the toothed ring 5. The inner annular recess 27 has an inner diameter that does not interfere with the lever 10 when the pawl 6 is engaged with the toothed ring 5.

As a result, the inner annular protrusion 26 engages the lever 10 fixed to the pawl 6 and thereby moves the pawl 6 to disengage from the toothed ring 5 against the force exerted by the elastic element 28 when the control sleeve 14 is in the axial releasing position, and the inner annular recess 27 provides room enough for allowing the lever 10 to be moved by the force exerted by the elastic element 28 to engage the pawl 6 with the toothed ring 5 when the control sleeve 14 is in the locking position.

The ratchet mechanism is configured to block rotation of the outer casing 2 with respect to the base body 1 in the loosening direction but allow relative rotation in the tightening direction when the control sleeve 14 in the locking position and to allow relative rotation between the outer casing 2 and the base body 1 in both loosening and tightening directions when the control sleeve 14 is in the releasing position.

In the shown embodiment, the lever 10 fixed to the pawl 6 and the inner annular protrusion 26 of the cantilevered portion of the control sleeve 14 have respective beveled edges 11, 29 intended to interact with each other in order to facilitate mutual engagement when the control sleeve 14 is moved from the locking position to the releasing position. In an alternative embodiment (not shown), only the lever 10 has a beveled edge 11 intended to interact with the inner annular protrusion 26 in order to facilitate mutual engagement when the control sleeve 14 is moved from the locking position to the releasing position. In another alternative embodiment (not shown), only the inner annular protrusion 26 has a beveled edge 29 intended to interact with the lever 10 in order to facilitate mutual engagement when the control sleeve 14 is moved from the locking position to the releasing position.

The scope of the intention is defined by the attached claims.

The invention claimed is:

1. A chuck having a locking device, comprising:
   a base body having a central axis and being connectable for rotating with a drive shaft;
   an outer casing axially fixed but rotatable about the central axis outside the base body, the outer casing having inner guides leading to an axial opening;
   a plurality of jaws movable along the inner guides;
   a fitting mechanism linking rotations of the outer casing with respect to the base body to movements of the jaws; and
   a locking device comprising a ratchet mechanism and an outer control sleeve operating the ratchet mechanism through an inner annular protrusion of a first diameter and through an inner annular recess of a second diameter bigger than the first diameter, the inner annular protrusion and the inner annular recess being provided in an inner surface of the control sleeve surrounding the ratchet mechanism and being adjacent to each other in the axial direction;
   wherein the ratchet mechanism comprises a toothed ring fixed to the base body, a pawl fixed to a lever pivotally mounted to the outer casing about a pivot pin parallel to the central axis, and an elastic element urging the pawl to engage the toothed ring;
   the control sleeve is connected to the base body through a cam configured to determine a simultaneous rotatably and axially slidably movement of the control sleeve relative to the base body between a releasing position, in which the inner annular protrusion of the control sleeve surrounds and interferes with the lever maintaining the pawn disengaged from the toothed ring against a force exerted by the elastic element, and a locking position, in which the inner annular recess of the control sleeve surrounds and does not interfere with the lever providing room enough to the lever for the engagement of the pawn with the toothed ring under the force exerted by the elastic element; and
   the ratchet mechanism is configured to block rotation of the outer casing with respect to the base body in the loosening direction but allowing relative rotation in the tightening direction when the control sleeve in the locking position and to allow relative rotation between the outer casing and the base body in both loosening and tightening directions when the control sleeve is in the releasing position;
   the axial position of the control sleeve providing an apparent visual indication of the configuration of the ratchet mechanism.

2. The chuck according to claim 1, wherein the lever has a beveled edge intended to interact with the inner annular protrusion to facilitate mutual engagement when the control sleeve is moved from the locking position to the releasing position.

3. The chuck according to claim 1, wherein the inner annular protrusion has a beveled edge intended to interact with the lever to facilitate mutual engagement when the control sleeve is moved from the locking position to the releasing position.

4. The chuck according to claim 1, wherein the lever and the inner annular protrusion have respective beveled edges intended to interact with each other to facilitate mutual engagement when the control sleeve is moved from the locking position to the releasing position.

5. The chuck according to claim 1, wherein the toothed ring comprises a plurality of teeth protruding in a direction perpendicular to the central axis.

6. The chuck according to claim 5, wherein the toothed ring comprises a plurality of teeth having crests and valleys parallel to the central axis.

7. The chuck according to claim 1, wherein the elastic element is a coil spring arranged under compression between a seat formed in the outer casing and the lever fixed to the pawl.

8. The chuck according to claim 1, wherein the cam comprises a cam groove formed in a locking ring arranged outside the base body and fixed inside to the proximal portion of the control sleeve and a pin installed in a hole formed in the base body and inserted in the cam groove.

9. The chuck according to claim 1, wherein the control sleeve has a proximal portion connected to the base body through the cam, and has a cantilevered distal portion, opposed to the proximal portion, which covers the ratchet mechanism and includes the inner annular protrusion and the inner annular recess.

10. The chuck according to claim 1, wherein the first diameter and the second diameter are concentric with the central axis of the base body.

* * * * *